United States Patent [19]
Wheeler

[11] 3,955,488
[45] May 11, 1976

[54] FOOD DEHYDRATER

[76] Inventor: Jack I. Wheeler, 7855 S. 114th, Seattle, Wash. 98178

[22] Filed: Oct. 29, 1974

[21] Appl. No.: 518,478

[52] U.S. Cl. .................................. 99/483; 99/467
[51] Int. Cl.² ........................................ A23L 3/00
[58] Field of Search ............ 99/483, 484, 485, 467, 99/482, 451, 486; 34/64, 132, 192, 201, 215

[56] References Cited
UNITED STATES PATENTS

| | | | |
|---|---|---|---|
| 295,382 | 3/1884 | Geiger | 99/482 X |
| 2,573,772 | 11/1951 | Nysten | 99/467 |
| 2,789,877 | 4/1957 | Pfundt | 99/482 X |
| 3,002,444 | 10/1961 | Hoebing | 99/482 X |
| 3,096,706 | 7/1963 | Cardwell | 99/482 X |
| 3,173,357 | 3/1965 | Nunnery | 99/482 X |

*Primary Examiner*—Peter Feldman
*Assistant Examiner*—Arthur O. Henderson
*Attorney, Agent, or Firm*—Cole & Jensen

[57] ABSTRACT

A dehydrater for removing the majority of the liquid content of foods. The dehydrater utilizes an outer shell adapted to enclose the food being dehydrated and incorporates appropriate venting to permit the circulation of air within and through the unit. The food is placed within the unit upon slidable shelves or drawers which, although substantially solid, are provided with critically spaced and sized holes to permit adequate and even flow of heated air therethrough. The particular combination of vents assures that the food products on any given shelf are uniformly dried and that the temperature distribution within the cabinet is in accordance with the requirements. The heat for the dehydration is provided by a single heating unit placed in the bottom of the dehydrater and adapted and configured to provide the particular amount of heat necessary.

6 Claims, 6 Drawing Figures

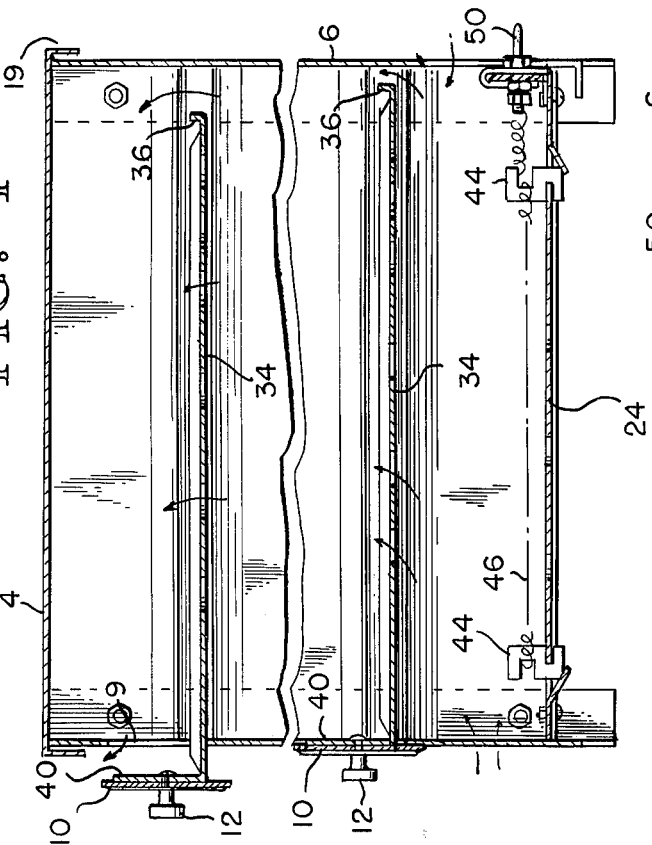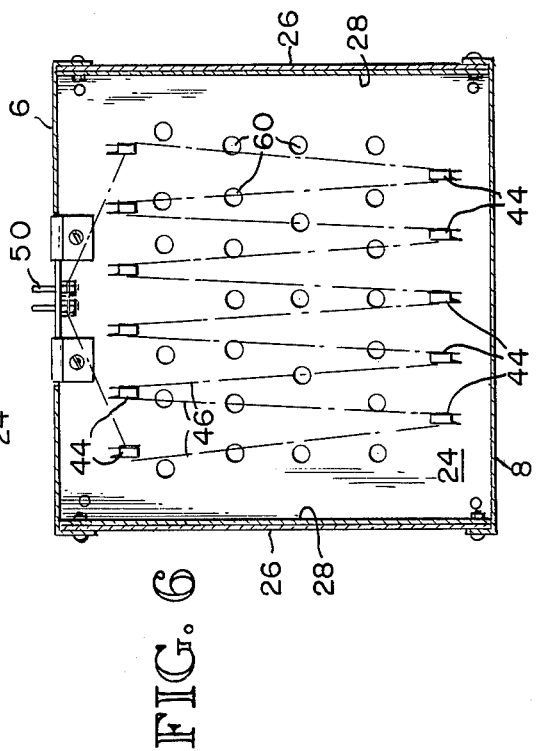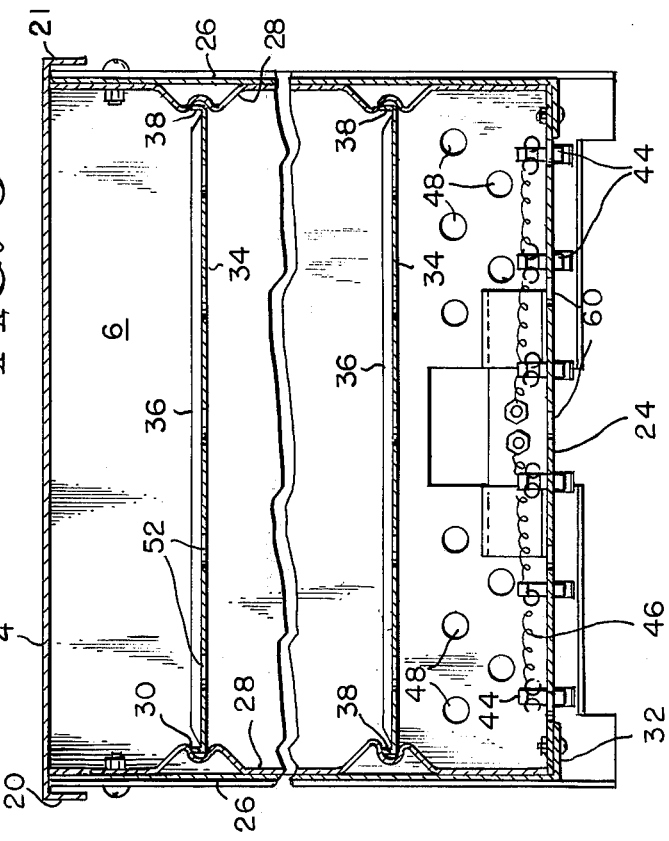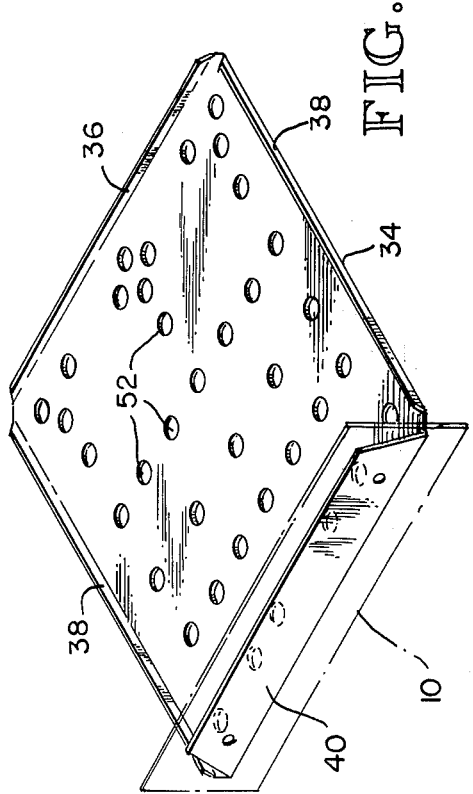

FOOD DEHYDRATER

BACKGROUND OF THE INVENTION

Dehydration as used herein is the method of processing foods by drying them so thoroughly without cooking that the majority of the liquid content is removed. This is most successfully done at a very low, even heat such that the food product is not cooked and is dried thoroughly. Utilizing dehydration, foods can be prepared and stored during the growing season for year-round use without the necessity of sugars, jars, refrigeration and the other inconveniences normally associated with preservation of foods.

Dehydrated foods retain much of their natural nutrients and food value and in most cases retain more of these nutrients than in alternative methods of preservation. Most dehydrated foods can be returned to the natural state of appearance and taste by rehydration and can be used in their dehydrated state as a nutritious snack.

Historically, man has used enclosed heated spaces for cooking and/or storing foods such as ovens, warming bins, and heating-serving carts. Further, man has used enclosed containers to enclose food stuffs for particular or special treatments such as smoking. Examples of these containers and their various structural concepts necessary to accomplish the desired result are well known in the art. Prior art examples of some of these structures are included herewith for reference purposes.

U.S. Pat. No. 1,281,341, granted to Truitt, Mar. 6, 1917 discloses an electric oven having a heating element located in the lower portion of an insulated enclosure and including as an integral part thereof holes within the food supporting shelves to allow upward flow of heated air and a fan driven return chimney at the rear portion of the oven to cause the air to recirculate over the heating coils and retain a stable cooking temperature.

U.S. Pat. No. 2,179,256, granted to Gill, Nov. 7, 1939, deals with the heating, drying and sterilizing cabinet primarily for use with towels or the like in hospitals, barber shops, etc. Each shelf includes a heating element to assure uniform temperature throughout the cabinet and the shelves are constructed such that there is space for air to circulate around the shelves and the objects contained thereon. Further, the sterilizing cabinet of this reference includes means whereby air can be circulated into and out of the cabinet when the cabinet is closed and in use.

U.S. Pat. No. 2,561,517, granted July 24, 1951 to Ladge, discloses a dispensing cabinet wherein food stuffs, particularly breads and the like are stored and maintained warm for a considerable period of time. It is imperative that food kept under these conditions must not lose their moisture content and so therefore the cabinet makes provision for continual recirculation of the moist air within the cabinet and does not permit entrance or exit of the air.

U.S. Pat. No. 2,919,339, granted to Hilliker, Dec. 29, 1959, discloses a food service cart for use in hospitals or the like which incorporates as an integral part thereof a heating section having a heat storing element and a cooling section having a compressor and other cooling elements.

U.S. Pat. No. 3,127,499, granted Mar. 31, 1964 to Savio et al., discloses an electrically heated, forced air circulation oven and incorporates as an integral part thereof heating elements located around the entire interior of an insulated box and provides means for continuously circulating the heated air throughout the interior assuring a constant cooking temperature throughout the interior.

U.S. Pat. No. 3,458,686, granted July 29, 1969 to Gvozdjak is another example of an electric oven with heat circulation means therein and includes as an integral part, air directing baffles assuring that the heated air is uniformly distributed throughout the interior without having the upper portion of the oven substantially hotter than the lower portion. It is the desire, as stated in the patent, that the contents are consistently and efficiently heated to substantially the same cooking temperature.

U.S. Pat. No. 3,674,982, granted July 4, 1972 to Hoyt et al., discloses an elaborate zone controlled cook oven designed primarily for use on airplanes or the like wherein the desired mean temperature throughout each area or zone within an oven where frozen food is deposited is subject to independent control. Again, it is the intent and purpose of the structure to assure that the contents placed within the oven are subject to uniform heat and then maintained at a palatable heat until just prior to serving.

Thus, it can be seen, that although each of the structures hereinabove described with respect to prior art patented devices, each contain in the broad sense a containing or enclosed structure and a heating element or elements. Each is designed for a particular purpose, ie., either to continually recirculate the heated air within a cabinet to insure that the moisture content is retained or alternatively to provide a uniform temperature throughout the interior of the container for cooking.

Further prior art includes elaborate food dehydraters utilizing thermostatically controlled heating elements and fan forced circulation.

Because of the particular nature of dehydration of food stuffs it is necessary that the temperature at which the food is exposed is of a very low degree and of a constant nature. Too high a temperature will cause the food to cook or alternatively if the high temperature is combined with a rapid circulation of air, will cause the food to form a crust on the exterior thereof without completely drying the interior. The incomplete drying is often the cause of food spoilage. The food tends to deteriorate from the inside. It is also critical to have the food being dehydrated subjected to a constant and gentle flow of air without causing the above noted exterior crusting or cooking.

It is therefore an object of the present invention to provide a simple container for use in dehydration of foods wherein the structure is such that the operator need not have particular experience or expertise in the process to satisfactorily preserve the food and there is no danger of cooking the food.

It is further an object of the present invention to provide a food dehydrating device wherein the heating element and the integral provision for the constant circulation of the air within the cabinet are such that continuous attention is obviated. An operator need only place the food stuff upon the provided shelving and the structure of the cabinet itself in conjunction with the provided heating element will, upon being attached to the proper receptacle do the dehydrating in an efficient and satisfactory manner.

It is yet another object of the present invention to provide a cabinet which has as an integral part thereof means supporting the food containing shelves or drawers and further providing a means for carrying the heated air from the heating element which is located in the bottom of the container to the top in such a manner that the food located on the lowest shelf of the container is maintained at a slightly higher temperature than the food stuff at the top of the container.

Still another object of the present invention is to provide a dehydrater wherein air circulation is provided throughout the interior of the container and a simple mechanical means is provided whereby the temperature to which the food is subjected may be quickly and easily controlled by the operator.

It is still another object of the present invention to provide a combination of a heating element having a predetermined resistance with openings throughout the container for circulation of air. Outside air is admitted to the cabinet through restrictive openings and are determinative of the desired and optimal circulation of air for the dehydration of the product.

BRIEF DESCRIPTION OF DRAWINGS

FIG. 3 is a sectional view taken along lines 3—3 of FIG. 1 showing the inter-relationship of the heating element, the food supporting shelves and the construction of the side walls of the inventive dehydrater.

FIG. 4 is a section view taken along lines 4—4 of FIG. 1 disclosing the inter-relationship between the food supporting shelves and the rear of the food dehydrater.

FIG. 5 is a perspective view of one of the food supporting shelves showing the irregular pattern of holes located therein such that the warmed air will flow evenly throughout the cabinet causing even dehydration of the product.

FIG. 6 is a plan view of the bottom of the dehydrater including the heating element.

DETAILED DESCRIPTION OF THE DRAWINGS

Figure 1:
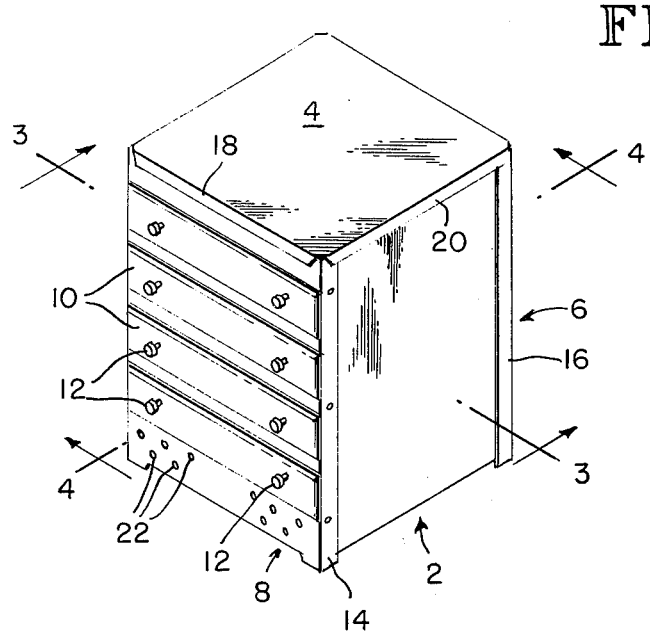
FIG. 1 is an isometric view of the inventive food dehydrater.

As seen in FIG. 1, the food dehydrater is substantially a rectangular closed box having sides 2, a top 4, a back 6 and a front 8. The front 8 includes a plurality of rectangular slots 9 (See FIG. 2) to receive sliding shelves or drawers having fronts 10 and knobs 12. It is to be noted that the front 8 has perpendicular flanges 14 to be secured to the sides 2, the back 6 includes perpendicular flanges 16 to be secured to sides 2, and the top 4 includes perpendicular flanges 18, 19, 20 and 21 which form a downwardly projecting circumscribing ledge allowing the top to be set into position, be secure and yet permit the escape of moisture laden air. Thus as can be seen, when assembled, the front, back, and sides form a rigid structure when, as noted below, they are combined with the bottom. Further to be noted in this figure is the fact that the front panel 8 includes as its bottom portion a plurality of ventilation holes 22 and flanged air slots 23 to be described in detail later.

Figure 2:
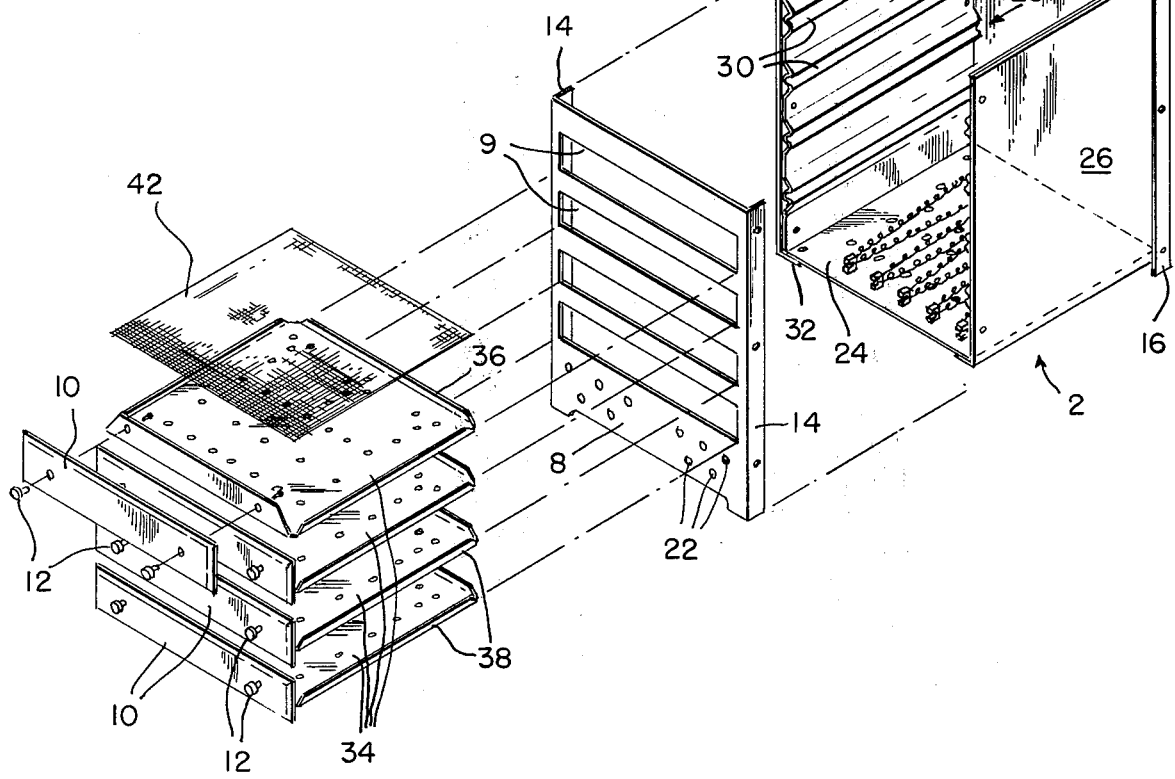
FIG. 2 is an exploded view of the food dehydrater disclosing interior details of said dehydrater.

Referring now to FIG. 2 the structural details of the dehydrater can be more clearly seen. As seen in this view, it becomes apparent that the combination of the back 6 with its rectangular flanges 16, the front 8 and its perpendicular flanges 14 interlocking with the sides 2 and the bottom unit 24 which is secured to the sides 2 as described hereinafter, form a rigid rectangular box. It is important to note that this rectangular box is thus formed without the necessity of any framework and thus becomes a light weight, economical, rigid structure. The top, as noted above, is not secured and thus permits the escape of air and further, may be readily removed to permit thorough cleaning of the interior.

Further to be seen in this figure is that the sides 2 comprise an outer, relatively smooth planar portion 26 and an interior corrugated portion 28 which because of the configuration and the horizontal placement of the corrugations provides guides or slides 30 for each of the shelves to be described hereinafter. The sides 2 include a perpendicular flange 32 which extends toward the interior of the container at the bottom thereof, when the side elements 28 and 26 are secured together thereby providing a rigid shelf to receive the bottom 24 which is fastened to the inwardly projecting flanges.

The individual food supporting shelves or trays are rectangular in shape having a bottom 34 including apertures to be described hereinafter and upwardly extending flanges 36 and 38. An upwardly extending flange 40 of greater dimensions forms the front of the tray itself and provides a base to which the face 10 of the shelf is secured. Face 10 of the shelf is secured to the flange by means of the threaded securement for the knobs 12 which passes through apertures provided in the face 10 and the flange 40. A Fiberglas screen 42 is layed over the top of the tray 34 to prevent the food particles from falling through the apertures provided in the bottom of the tray. The Fiberglas screen provides a barrier, preventing the food from touching the aluminum tray and, because of its characteristics, is easy to keep sanitary, thus rendering the entire unit simpler to use and clean. Further, it is to be noted that at the option of the user, when the food to be dehydrated contains a great deal of liquid, liquid absorbing means may be placed within the tray to prevent dripping during the early stages of the dehydration process.

Attention is now directed to FIG. 2 wherein the placement of shelves or trays 34 in conjunction with the interior corrugated side wall 28 having the integral grooves 32 to receive the tray 34 can best be seen. Further to be seen in this view are the inwardly projecting flanges 32 from the side wall 28 which supports the base member 24. Base member 24 as upwardly extending insulators 44 around which are woven a single strand of coiled electrical resistance wire 46. The electrical resistance wire 46 is of 23 gauge nichrome type and is carefully measured to provide the predetermined 80 ohm resistence and thus control the heat. It has been found to be most desirable to maintain a temperature of 165° Fahrenheit at the bottom shelf, 110° Fahrenheit at the top shelf. Obviously, the heat level of the shelves between the extremes will be maintained at an intermediate temperature. It is to be understood that the particular configuration, location and type of wire has been empirically determined and the configuration as disclosed in FIG. 6 is that which provides the most even and economical heat for the dehydration when combined with the size of the container and the venting provided. As seen also in FIG. 3 the back wall 6 of the enclosure has a plurality of perforations 48 in its lower portion to allow air to flow in and over the heating coil 46 and then upwardly around the shelves.

The perforations 48 in the back wall are substantially identical to those 22 in the front wall and thus in combination with the open portion at the bottom of the sides, front and back an even flow of air is provided over the heating coils and then upwardly passing by the food stuff. The heating coil 46 is attached to a suitable electrical connection in the form of a receptacle to receive a standard appliance cord providing power for the coil.

Referring now to FIG. 4, the elements can be seen and it is important to note in this view that the shelves or trays having bottoms 34 and a rear flange 36 when in the closed position do not extend entirely to the rear wall 6 and thus provide a chimney effect in the back of the dehydrater allowing the heated air to flow upwardly, greatly assisting in the proper heat distribution even though a substantial number of the openings in the shelves are covered. As seen in this figure the air flows inwardly through the front and rear of the container, upwardly through the chimney at the back of the container as well as through the various perforations in the shelves. It is to be noted that as shown in this figure the top shelf may, at the option of the operator, be left ajar such that at the latter stages of the dehydration, greater air flow may be provided if desired.

As seen in FIG. 5 the individual shelves 34 include a plurality of irregularly spaced holes or perforations 52. These perforations 52 in conjunction with the heating element 46 and and the particular configuration thereof as well as the openings 22 and 48 provide uniform air flow and heating resulting in the proper dehydration of the food stuff.

The particular configuration of the heating element 46 as well as the insulators 44 in conjunction with the holes 60 in the bottom is best seen in FIG. 6. The particular configuration of the perforations in conjunction with the particular wire and combination with the ventilation holes was determined empirically and the irregularity as stressed in this view provides the ventilation necessary to promote an even drying of the food products without causing a crusting or permitting a cooking of the product.

As can thus be seen the present invention provides a simple mechanism for dehydrating food and the combination of the particular structure in conjunction with the critical means provided for air flow and the particular predetermined heating element provides a safe, simple and economical dehydrating unit which can be used by those who do not have particular skill or knowledge in the food dehydrating art. The structure and its combination of elements including the critically placed heating element and ventilation means dehydrates the food but will not cook or cause crusting thereof.

What is claimed is:

1. A device for dehydrating food products or the like wherein the particular combination and placement of elements renders the device self-regulating, comprising:
   a. rectangular box-like enclosure means comprising imperforate sides, a vented rear element, a vented front element including access openings to receive supporting trays, a perforate bottom element and an easily removable top element,
   b. heating means located in the bottom of the enclosure means to provide a predetermined quantity of regular, slow heat evenly distributed throughout the enclosure, and
   c. a plurality of perforate food supporting trays, each movable horizontally within the enclosure means from a closed position for dehydrating the material, to an open position for loading and unloading, said trays when in the closed position, closing the openings in the front element of the enclosure means and extending rearwardly to terminate spaced from the back of the enclosure forming a vertical chimney open to the interior to the enclosure along the rear element whereby the heated air is able to freely flow upwardly generating a consistent temperature throughout the interior of the enclosure.

2. A device as in claim 1 wherein the food supporting trays are of a rigid material having perforations therein to permit the through flow of heated air.

3. A devise as in claim 1 wherein the sides include inwardly extending horizontally placed guides to support the trays.

4. A device as in claim 1 wherein the trays do not meet the enclosures at the corners and thus permit upward flow of heated air around the periphery of the enclosures.

5. A device as in claim 1 wherein the easily removable top element is held in position by the force of gravity, said top thus being easily removed for cleaning the interior of the enclosure means.

6. A device as in claim 1 wherein the air flow may be increased by leaving the trays in a slightly open position said top being secured such that it can be placed to selectively cover either all or a large portion of the enclosure means.

* * * * *